US011687294B2

(12) United States Patent
Grom et al.

(10) Patent No.: US 11,687,294 B2
(45) Date of Patent: Jun. 27, 2023

(54) PRINTER WITH INTEGRATED WIRELESS BRIDGE

(71) Applicant: ZEBRA TECHNOLOGIES CORPORATION, Lincolnshire, IL (US)

(72) Inventors: Robert A. Grom, Hawthorn Woods, IL (US); David A. Langevin, Warwich, RI (US); Ujjaval C. Patel, North Attleboro, MA (US); Craig M. Swanson, Arlington Heights, IL (US); Gerard R. Corriveau, Blackstone, MA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/488,751

(22) Filed: Sep. 29, 2021

(65) Prior Publication Data

US 2023/0096968 A1   Mar. 30, 2023

(51) Int. Cl.
*G06F 3/12* (2006.01)

(52) U.S. Cl.
CPC .......... *G06F 3/1209* (2013.01); *G06F 3/1206* (2013.01); *G06F 3/1247* (2013.01); *G06F 3/1259* (2013.01); *G06F 3/1292* (2013.01)

(58) Field of Classification Search
CPC .... G06F 3/1209; G06F 3/1206; G06F 3/1247; G06F 3/1259; G06F 3/1292

USPC ........................................................ 358/1.15
See application file for complete search history.

(56) References Cited

U.S. PATENT DOCUMENTS

| 8,091,774 | B2* | 1/2012 | Silverbrook | H04N 1/32101 358/1.9 |
|---|---|---|---|---|
| 11,331,924 | B2* | 5/2022 | Gardner | B41J 2/04508 |
| 2002/0105673 | A1* | 8/2002 | Kurashina | B41J 3/4075 358/1.15 |
| 2014/0185096 | A1* | 7/2014 | Tokunaga | G03G 15/5075 358/1.15 |
| 2015/0356717 | A1* | 12/2015 | Madden | H04N 1/00082 358/1.6 |
| 2016/0182757 | A1* | 6/2016 | Yoo | H04N 1/33369 358/1.15 |
| 2018/0088874 | A1* | 3/2018 | Minami | B41J 2/365 |
| 2018/0285265 | A1* | 10/2018 | Pugh | G06F 3/1285 |

* cited by examiner

*Primary Examiner* — Allen H Nguyen

(57) ABSTRACT

A computing device includes: a housing configured to receive a supply of print media; a print head supported by the housing; a wireless communications subsystem supported by the housing; a controller supported by the housing, the controller configured to: control the communications subsystem to detect a data collection device; obtain, from the data collection device via the communications subsystem, monitoring data collected by the data collection device indicative of an environmental condition; transmit the monitoring data; receive a command based on the monitoring data; and control the print head to apply indicia to the print media according to the command.

27 Claims, 5 Drawing Sheets

PRINTER WITH INTEGRATED WIRELESS BRIDGE

BACKGROUND

Environmental sensors can be deployed in a wide variety of contexts, including in facilities such as manufacturing facilities, transport and logistics facilities, medical facilities, and the like. Such sensors can be employed to monitor various environmental conditions. However, the sensors may not be capable of readily providing monitoring results to a central location for evaluation. The sensors may also lack the ability to generate notifications or other feedback generated as a result of such evaluation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
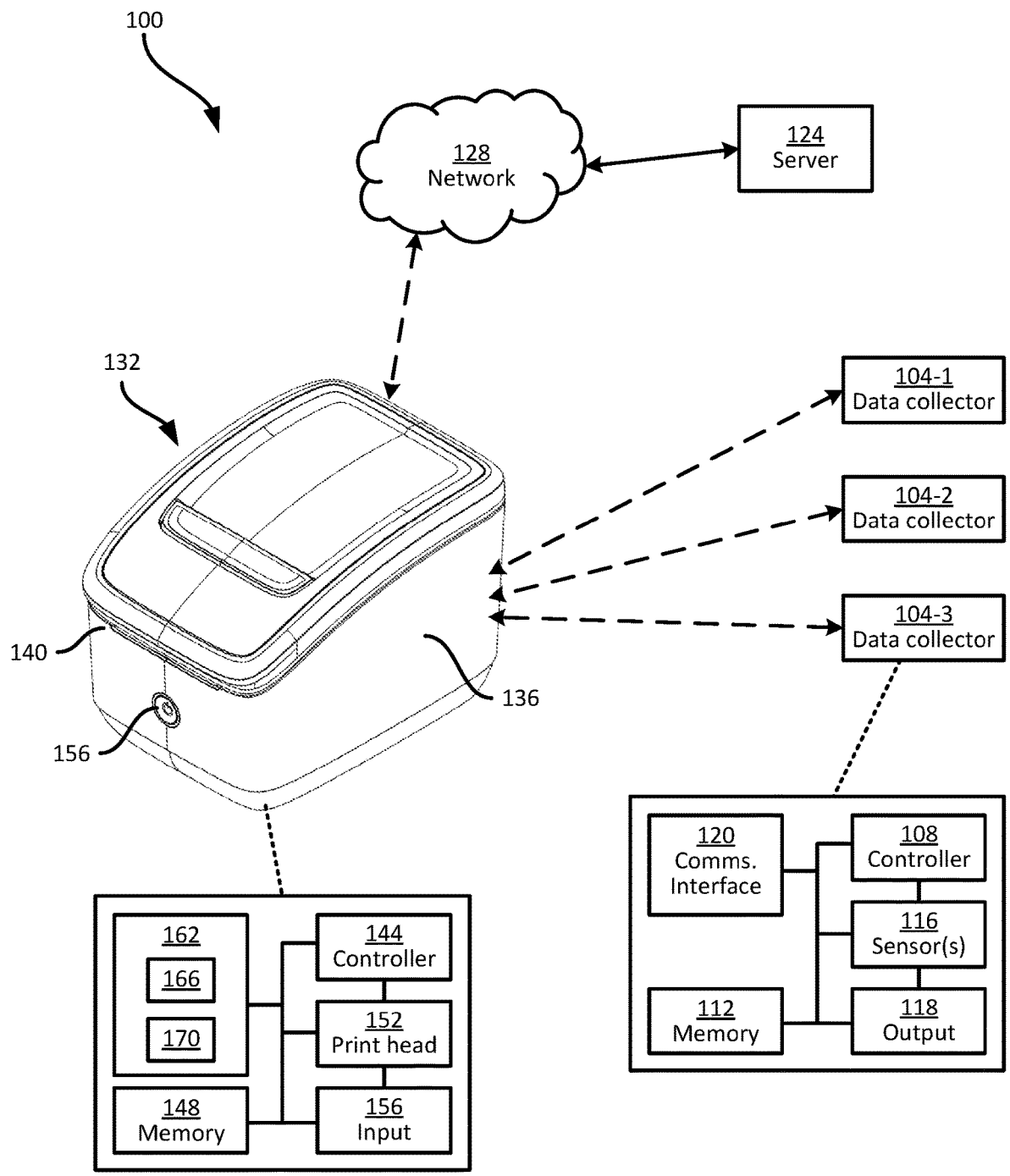
FIG. 1 is a diagram of a system for collecting and processing monitoring data.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device including: a housing configured to receive a supply of print media; a print head supported by the housing; a wireless communications subsystem supported by the housing; a controller supported by the housing, the controller configured to: control the communications subsystem to detect a data collection device; obtain, from the data collection device via the communications subsystem, monitoring data collected by the data collection device indicative of an environmental condition; transmit the monitoring data; receive a command based on the monitoring data; and control the print head to apply indicia to the print media according to the command.

Additional examples disclosed herein are directed to a method in a computing device, the method comprising: controlling a communications subsystem of the computing device to detect a data collection device; obtaining, from the data collection device via the communications subsystem, monitoring data collected by the data collection device indicative of an environmental condition; transmitting the monitoring data; receiving a command based on the monitoring data; and controlling a print head of the computing device to apply indicia to print media from a supply of print media supported by a housing of the computing device, according to the command.

Further examples disclosed herein are directed to a non-transitory computer-readable medium storing instructions executable by a processor a computing device to: control a communications subsystem of the computing device to detect a data collection device; obtain, from the data collection device via the communications subsystem, monitoring data collected by the data collection device indicative of an environmental condition; transmit the monitoring data; receive a command based on the monitoring data; and control a print head of the computing device to apply indicia to print media from a supply of print media supported by a housing of the computing device, according to the command.

FIG. 1 illustrates a system 100 for collecting and processing monitoring data. The system 100 includes at least one data collection device 104, also referred to as a data collector 104. In the illustrated example, the system 100 includes three data collectors 104-1, 104-2, and 104-3. In other examples, however, the system 100 can include smaller or greater numbers of data collectors 104. The data collectors 104 can be deployed to monitor environmental conditions, e.g. in various regions of a facility such as a manufacturing facility, a transport and logistics facility such as a warehouse, or the like.

In other examples, the data collectors 104 can be deployed in association with packages or other items. For example, respective data collectors 104 can be affixed to packages for transport, to monitor environmental conditions to which the packages are exposed. Examples of environmental conditions include temperature, humidity, and acceleration (indicative of shocks or impacts). The packages may contain pharmaceutical products, food, or other items sensitive to environmental conditions. The transport and handling of such items may therefore be subject to environmental requirements, such as a requirement that the temperature of a package not exceed a predetermined threshold (e.g. that a "cold chain" be maintained). The data collectors 104, by periodically logging measurements such as temperature measurements, enable a determination of whether the above-mentioned environmental requirements have been satisfied.

As will therefore be apparent, the number of data collectors 104 in the system 100 can vary widely, depending on the size of a facility, the number of packages in circulation, and the like. Some implementations of the system 100 can include hundreds or thousands of data collectors 104.

Each data collector 104 includes certain internal components, examples of which are illustrated in connection with the data collector 104-3 in FIG. 1. The data collectors 104, in particular, include a controller 108 such as a central processing unit (CPU), application-specific integrated circuit (ASIC) or the like, coupled with a memory 112. The memory 112 can include a suitable combination of volatile and non-volatile memory, and serves at least in part to store measurements collected by one or more sensors 116 of the data collector 104. The sensors 116 can include any one or more of a temperature sensor, a humidity sensor, an accelerometer, a gyroscope, and the like. The controller 108 can be configured to periodically obtain measurements from the sensor(s) 116, and to store such measurements in the memory 112. As will be discussed below, the controller 108 can also be configured to compare the measurements to one or more thresholds, e.g. to detect excursions in the environmental conditions to which the data collector 104 (and therefore the package, facility region, or the like with which the data collector 104 is associated) is subjected. Such excursions can also be stored in the memory 112, e.g. along with a timestamp indicating the time of the excursion.

The data collector 104 also includes an output device 118, controllable to generate visible or audible signals. For example, the data collector 104 can include an indicator light such as a light emitting diode (LED), a speaker or the like. The data collector 104 further includes a communications interface 120, such as a short-range interface (e.g. Bluetooth™ low energy, or BLE), enabling the data collector 104 to transmit the above measurements to other computing devices.

The above components of the data collector 104 are contained within a housing, which also contains a power source, e.g. a battery, to supply electrical power to those components.

The system 100 also includes a server 124 configured to obtain and process the data collected by the data collectors 104. For example, in an implementation in which the data collectors 104 are affixed to packages with environmental requirements during transport and handling, upon arrival of a package at a destination, the server 124 can be configured to validate the data collected by the corresponding data collector. The validation process determines whether the above-mentioned environmental requirements were met. For example, if the monitored data from the data collector 104 reveals that the package was subjected to more than a threshold number of temperate excursions, and/or to any temperature excursions greater than a threshold, the validation fails, and the contents of the package may be discarded, quarantined, or the like. As will be apparent, the server 124 can perform validation functions for monitored data from data collectors 104 mounted in a facility in addition to, or instead of, the packages mentioned above.

The server 124 may be located remotely from the data collectors 104. For example, the server 124 can be deployed as a distributed computing system connected to a network 128 (e.g. a wide-area network). Therefore, the data collectors 104 and the server 124 may not be capable of direct communication. In particular, the short-range communications interfaces 120 of the data collectors 104 may be capable of establishing local, ad-hoc communications links to other devices in physical proximity to the data collectors 104, but may not be capable of establishing communications with other devices via the network 128.

A lack of direct communication between the server 124 and the data collectors 104 may also complicate the provision of substantially real-time feedback indicating the results of the above-mentioned validation at the server 124. For example, in an implementation in which the data collectors 104 are affixed to packages, the validation may be used to guide handling of the packages upon arrival at a destination. In the absence of direct communication between the data collectors 104 and the server 124, the server 124 may be required to select a distinct computing device from a number of nearby devices, to which the validation results can be communicated. This may involve the deployment of specialized software and/or hardware to devices carried by personnel at the destination, and may also lead to validation results being communicated to the incorrect device(s) in the destination facility.

The system 100 therefore also includes a wireless bridge device with integrated printing functionality, in the form of a printer 132. The printer 132, as will be discussed in detail below, enables the collection of data from the data collectors 104 and the transmission of that data to the server 124, as well as the generation of notifications or other output that is readily accessible to personnel handling the packages to which the data collectors are affixed. By integrating bridge and printing functions, the printer 132 enables the collection and transmission of monitored data from the data collectors 104 to the server 124, as well as the generation of substantially real-time validation feedback based on the monitored data.

The printer 132 includes a housing 136 supporting a media supply, such as a roll of labels, receipt paper, or the like. Indicia are applied to the media, which is then dispensed, e.g. from an outlet slot 140 defined in the housing 136. Certain internal components of the printer 132 are also illustrated in FIG. 1, including a controller 144 such as a CPU, ASIC, or the like, and a non-transitory storage device such as a memory 148, e.g. storing instructions executable by the controller 144 to execute bridge and print functionality.

The printer 132 further includes a print head 152 controllable to apply indicia to the media from the supply, as mentioned above. The print head 152 can include a thermal print head, e.g. with an array of independently controllable thermal elements to activate pigment in the media, and/or to transfer pigment from a ribbon within the housing 136 to the media. In other examples, the print head 152 can employ impression technologies other than thermal printing.

The printer 132 also includes an input device 156 interconnected with the controller 144. The input device 156 can include one or more buttons, touch panels, keypads, or the like, and is configured to receive input and provide data representative of the received input to the controller 144. Further, the printer 132 includes a communications subsystem 162 enabling the printer 132 to communicate with both the data collectors 104 and the server 124. For example, the subsystem 162 can include a first communications interface 166, and a second communications interface 170. The first interface 166 can include transceivers, antenna elements, and corresponding control hardware enabling ad-hoc, short-range communications, e.g. via BLE or the like. The second interface 170 can include transceivers, antenna elements, and corresponding control hardware enabling communications via the network 128, e.g. via WiFi.

As will be discussed in detail below, the printer 132 is configured, e.g. via the execution of computer-readable instructions stored in the memory 148 by the controller 144, to interact with both the data collectors 104 and the server 124, to enable validation of monitored data by the server 124, and generation of substantially real-time notifications resulting from the validation. The printer 132 may also be employed to apply updated configuration settings to the data collectors 104.

Figure 2:
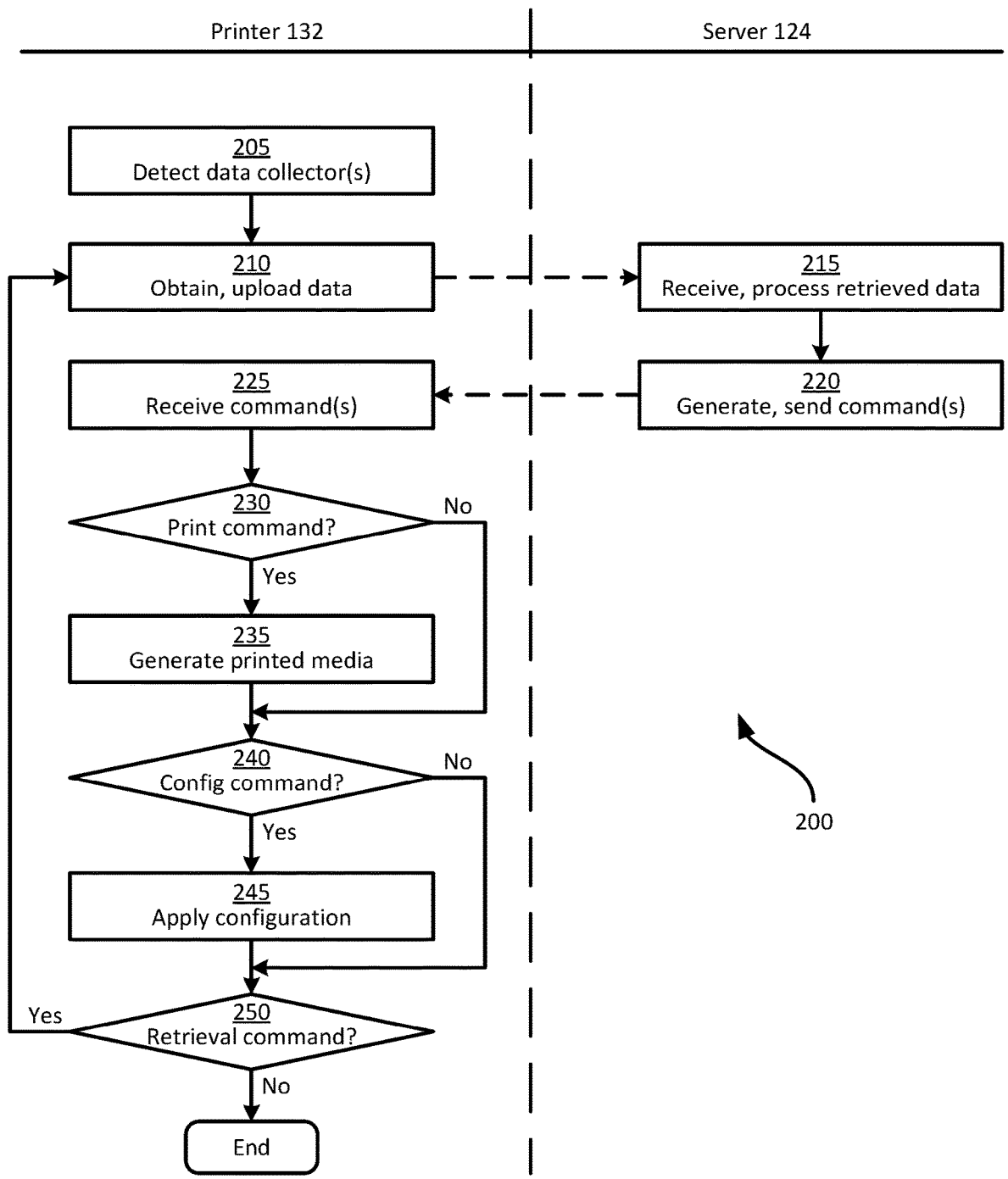
FIG. 2 is a flowchart of a method of collecting and processing monitoring data.

Turning to FIG. 2, a method 200 of obtaining and processing monitored data collected by data collector(s) 104 is illustrated. The method 200 is described below in conjunction with its example performance in the system 100. More specifically, the discussion below assumes that the data collectors 104 are deployed to monitor packages, such that a data collector 104 is affixed to each of any number of packages for which environmental conditions are to be monitored during transport and handling. As will be apparent to those skilled in the art, the functionality described below can also readily be applied to other deployments, such as those in which data collectors 104 are affixed in selected regions of a facility. As indicated in FIG. 2, certain blocks of the method 200 are performed by the printer 132, while others are performed by the server 124.

At block 205, the printer 132 is configured to detect data collectors 104. For example, the printer 132 can be deployed at a receiving dock or other suitable portion of a facility where inbound packages arrive. The printer 132 can be configured to periodically scan for data collectors 104 using the first communications interface 166. For example, the printer 132 can broadcast a beacon or other message via the interface 166. Any data collector 104 that detects the beacon can, in response, transmit an identifier of the data collector 104, such as a media access control (MAC) address, serial number, or the like. The nature of the identifier is not particularly limited, so long as the identifiers distinguish the data collectors 104 from one another.

If no data collector 104 is detected at block 205, the printer 132 can repeat the performance of block 205, e.g. after a configurable time period. When at least one data collector 104 is detected at block 205, the printer 132 is configured, at block 210, to obtain data from the detected data collector(s) 104 and upload the data to the server 124. In the present example, the data retrieved and uploaded at block 210 can simply include the identifiers mentioned above. As will be discussed below, further data can be obtained from the data collectors in response to commands received at the printer 132 from the server 124. In other examples, additional data can be retrieved at block 210 as well as the identifiers, such as monitored data. The monitored data can include sensor logs of temperature measurements, humidity measurements, and the like. The monitored data can also include excursion records indicating times at which configurable thresholds of environmental conditions were exceeded. The data retrieved at block 210 can also include configuration data, such as measurement frequency settings, excursion thresholds, and the like.

Figure 3:
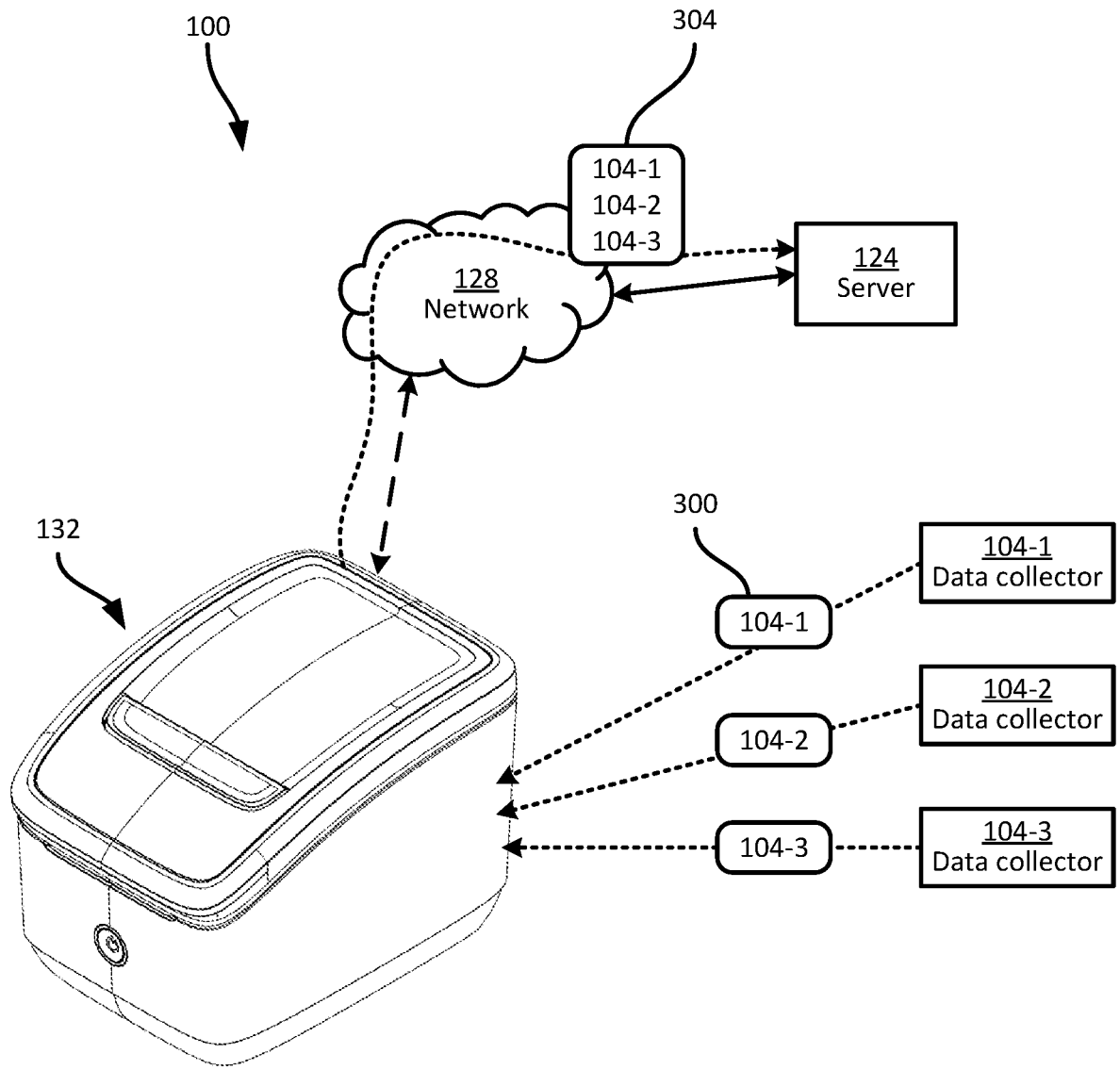
FIG. 3 is a diagram illustrating an example performance of blocks 205 and 210 of the method of FIG. 2.

FIG. 3 illustrates example performances of blocks 205 and 210. In particular, the data collectors 104 transmit respective identifiers 300 to the printer 132, e.g. in response to the beacon mentioned above. The printer 132, in turn, transmits the collected identifiers to the server 124, via the network 128. For example, the printer 132 can be configured format and/or package the identifiers into a message 304 for processing by the server 124. In some examples, the printer 132 can also supplement data retrieved at block 210 with additional information not that need not be directly available from the data collectors 104. For example, the printer 132 can determine a location of the printer 132 itself using the communication subsystem 162 (e.g. based on signal strength measurements from wireless access points, locating beacons and the like), and can provide such a location to the server 124 as an approximation of the locations of the data collectors 104. The printer 132 can also use signal strength measurements (e.g. received signal strength indicators, RSSI) associated with signals from the data collectors 104 to estimate locations of the data collectors 104 relative to the printer 132. Such relative locations can also be provided to the server 124. Obtaining of data at block 210 can be initiated by the printer 132 as set out above, e.g. by retrieving the data from the data collectors 104 using a beacon or other initiation signal. In other examples, the data collectors 104 can broadcast collected data unprompted, and the printer 132 can therefore obtain the data by detecting such broadcasts.

Returning to FIG. 2, at block 215, the server 124 is configured to process the data retrieved by the printer 132 and provided to the server 124. The server 124 can execute a wide variety of processing mechanisms at block 215, the details of which are beyond the scope of this discussion. For example, as mentioned earlier, in the case of monitoring data such as temperature measurements, humidity measurements, acceleration measurements and the like, the server 124 can perform one or more validation assessments, to determine whether the monitoring data indicates compliance with boundaries on environmental conditions for packages during transport and handling. In other examples, the server 124 can be configured to select updated configuration settings for the data collectors 104, examples of which are discussed further below.

In the present example, in which the data received by the server 215 includes only the data collector identifiers in the message 304, at block 215 the server 124 can be configured to process the identifiers to determine which data collectors 104 have arrived at a destination, and for which validation is therefore necessary. For example, the server 124 may access shipping records or the like and determine whether the packages associated with each data collector 104 have reached respective destinations. If a package has not yet reached its destination, the server 124 may delay validation of the monitoring data from the corresponding data collector 104 until a later point in time.

At block 220, the server 124 is configured to generate one or more commands and transmit the command(s) to the printer 132 via the network 128. Various examples of commands will be discussed below. In the current performance of block 220, it is assumed that the commands generated at block 220 are commands to retrieve additional data from the data collectors 104, e.g. for those data collectors 104 associated with packages that have arrived at a final destination. For example, the server 132 can generate a data retrieval command including the identifiers "104-1" and "104-2", instructing the printer 132 to retrieve monitoring data from the data collectors 104-1 and 104-2.

At block 225, the printer 132 is configured to receive the command(s) from the server 124. At blocks 230 to 250, the printer 132 is configured to execute the commands. The commands can include any combination of print commands, configuration commands, and data retrieval commands. To execute the command(s) received at block 225, the printer 132 can be configured to determine which types of commands have been received. For example, at block 230, the printer 132 can determine whether a print command has been received. When the determination at block 230 is affirmative, the print command is executed at block 235, and otherwise the printer 132 proceeds to block 240.

At block 240, the printer 132 can determine whether the command(s) received at block 225 include a configuration command. When the determination at block 240 is affirmative, the configuration command is executed at block 245, and otherwise the printer 132 proceeds to block 250. In this example performance of the method 200, the determinations at block 230 and 240 are negative, as the commands received at block 225 include only a data retrieval command. Examples of print commands and configuration commands will be discussed further below.

As will be apparent to those skilled in the art, blocks 230 to 250 need not be performed in the order illustrated in FIG. 2. For example, blocks 245 and 250 can be performed prior to blocks 230 and 235. In some examples, blocks 230 to 250 can be performance in parallel by the printer 132, such that each command received at block 225 is executed substantially simultaneously.

In the current performance of block 250, the determination is affirmative, as the command received at block 225 is a data retrieval command. The printer 132 therefore returns to block 210, to retrieve and upload data for the data collectors 104 identified in the command. In this example, therefore, the printer 132 retrieves monitoring data from the data collectors 104-1 and 104-2. The command from block 225 can also specify which data to retrieve from the identified data collectors 104. The printer 132 can, in turn, request the specified data from the data collectors 104-1 and 104-2. For example, the printer 132 and data collectors 104 may employ a predetermined application-level protocol to identify data for retrieval from the data collectors 104.

The monitoring data retrieved at block 210 for each data collector 104 identified in the command from the server 124 can include one or more time series of measurements, e.g. for each sensor 116 of the data collector 104 or for specifically identified ones of the sensors 116, when the data collector 104 includes multiple sensors 116. The monitoring data can also include, as noted earlier, excursion records indicating time periods during which monitored environmental conditions fell outside predetermined thresholds.

The data retrieved at block 210 can also include system information for the data collector 104, such as a battery level, manufacturer name, model number, firmware or other version information, and the like. The data retrieved at block 210 can further include a system log, e.g. indicating error conditions, power-cycling events and the like. Various other examples of data retrievable by the printer 132 at block 210 will also occur to those skilled in the art.

Figure 4:
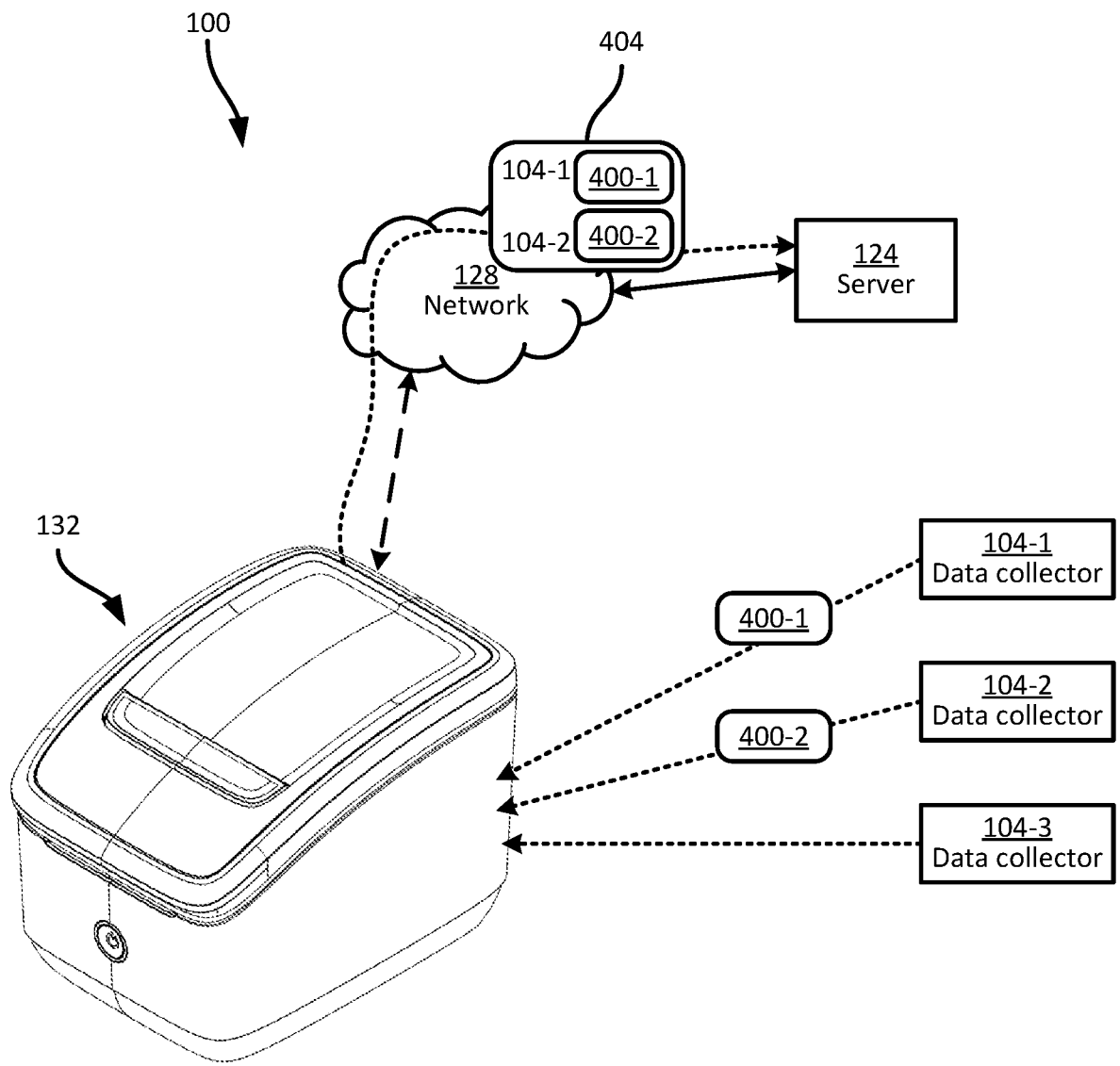
FIG. 4 is a diagram illustrating a further example performance of blocks 205 and 210 of the method of FIG. 2.

FIG. 4 illustrates a further example performance of block 210, following the data retrieval command mentioned above. In particular, the printer 132 is configured to retrieve monitoring data 400-1 and 400-2 from the data collectors 104-1 and 104-2, respectively. The printer 132 is then configured to package the monitoring data 400-1 and 400-2 into a message 404 for transmission to the server 124. In the illustrated example, the monitoring data 400-1 is transmitted along with the identifier of the data collector 104-1, and the monitoring data 400-2 is transmitted along with the identifier of the data collector 104-2.

Following retrieval of the data requested by the server 124 from the data collectors 104-1 and 104-2 at a further performance of block 210, the server 124 is configured to receive and process the data at block 215, and generate one or more commands at block 220, as noted above. In the current performance of blocks 215 and 220, for example, the server 124 can be configured to validate the monitoring data to assign a pass or fail indication to each of the data collectors 104-1 and 104-2. The specific processes involved in validation are, as mentioned earlier, beyond the scope of the present discussion. It is assumed that in this example, the outcome of the validation at block 215 is a pass indication for the data collector 104-2, and a failure indication for the data collector 104-1. That is, the monitoring data obtained from the data collector 104-1 indicates that the data collector 104-1 was exposed to environmental conditions that did not comply with predefined requirements.

In response to the processing at block 215, the server 124 generates a set of commands and returns the commands to the printer 132 at block 220. The commands, in this example, include a print command to cause the printer 132 to generate feedback (e.g. in the form a printed label) indicating to personnel handling the packages and data collectors 104 which packages have passed or failed validation. The commands can also include a configuration command to control certain aspects of the behavior of the data collectors 104-1 and 104-2.

Upon receiving the commands mentioned above at block 225, the printer 132 determines at block 230 whether the commands include a print command. As will be apparent, in this performance of block 230, the determination is affirmative. The printer 132 therefore proceeds to block 235. At block 235, the printer 132 generates printed media, by controlling the print head 152 (and associated internal components such as media transport rollers and the like) to apply indicia to the media according to the command received at block 225.

The printer 132 can, for example, print a label displaying an indication of whether validation passed or failed for each of the data collectors 104-1 and 104-2. In some examples, individual labels may be printed for each data collector 104, while in other examples, a single label may be printed bearing validation results for both data collectors 104. The printed media generated at block 235 can include, in addition to the validation indicator, an identifier of the corresponding data collector 104, package, or the like. The indicator can include a string of text (e.g. "pass" or "fail"), a color (e.g. red for failed validation and green for passed validation), or the like. In some examples, the command from block 225 is formatted as a print job, including an image to be applied to the media. In other examples, the printer 132 can store predefined label templates or formats in the memory 148, and generate an image to be applied to the media from such label formats according to the validation results received from the server 124.

Figure 5:
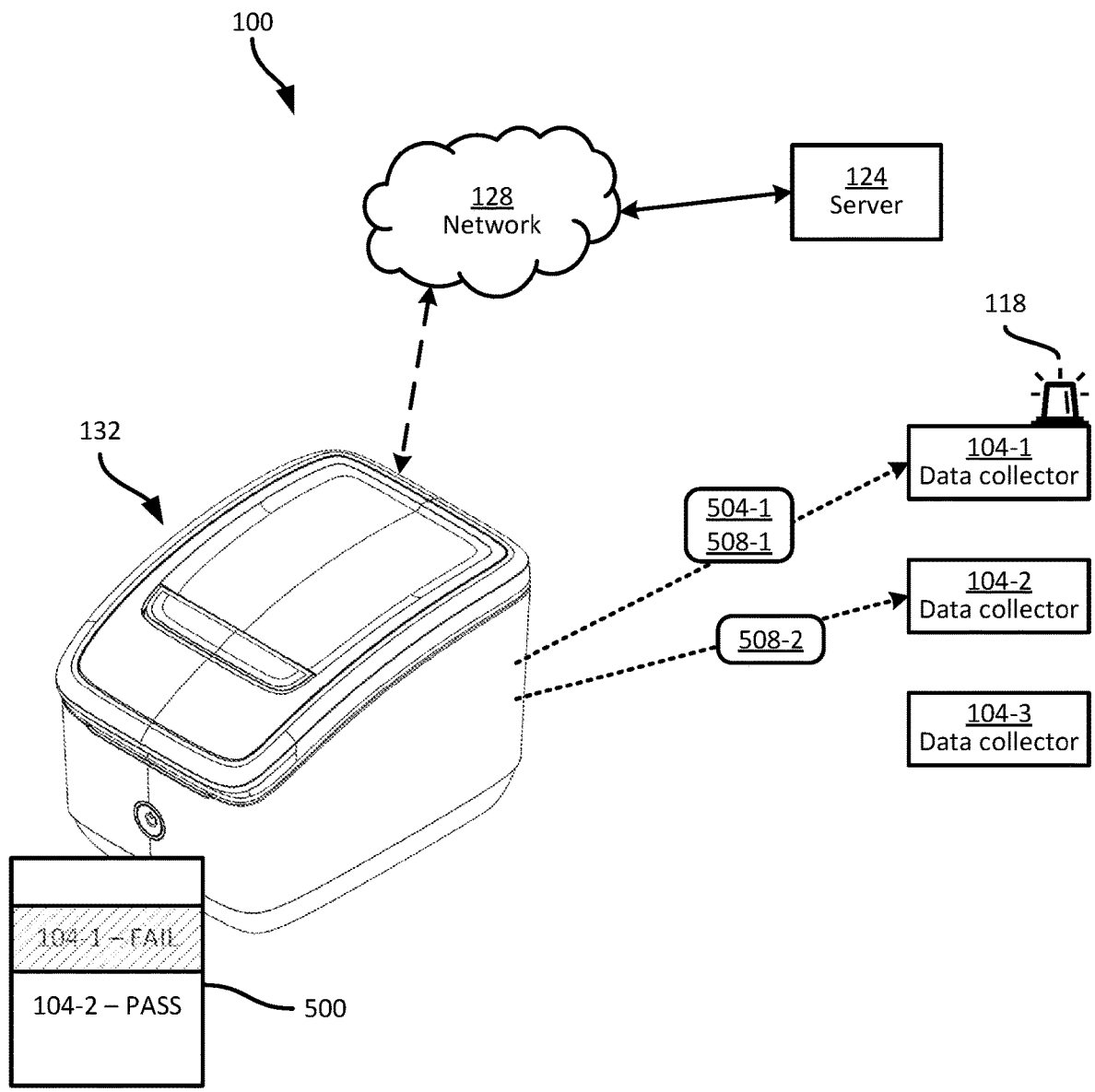
FIG. 5 is a diagram illustrating an example performance of blocks 235 and 245 of the method of FIG. 2.

Turning to FIG. 5, an example label 500 is illustrated, having been generated by the printer 132 in response to the print command from the server 124. In this example, the label 500 includes a validation indication for each of the data collectors 104-1 and 104-2. The indications include text strings, and can also, as in the case of the failure indication for the data collector 104-1, include color or patterns corresponding to the validation state of the relevant data collector 104. As will now be apparent, the generation of validation feedback at the same device (i.e. the printer 132) that is employed to detect and read data from the data collectors 104 can simplify the provision of substantially real-time validation feedback by mitigating or eliminating the need for the server 124 to identify a computing device to which to provide the feedback command.

Returning to FIG. 2, following generation of the printed media at block 235, the printer 132 proceeds to block 240, to determine whether the commands received at block 225 included a configuration command. In the present example, the determination at block 240 is affirmative, and the printer 132 therefore proceeds to block 245. At block 245 the printer 132 is configured to apply configuration parameters to one or more data collectors 104. The configuration parameters applied at block 245 are received from the server 124 with the command at block 225. The server 124 can select configuration parameters, for example, based on the monitoring data previously retrieved from the data collectors 104.

In some examples, the configuration parameters include an activity state for the output device 118. For instance, in the event that the validation process for a given data collector 104 indicates a failure, the server 124 can generate a configuration command for that data collector 104 to enable the output device 118, e.g. to flash an indicator light. As will be apparent, at any given time a number of data collectors 104 may be detected by the printer 132, and determining which data collectors 104 correspond to the validation results on the printed media 500 may therefore be challenging to handling personnel. The activation of output devices 118 for certain data collectors 104 (e.g. those with failed validations) may alleviate that challenge.

Other configuration parameters that may be provided along with activity states for output devices 118 can include an operational state for the data collector 104. For example, once monitoring data has been retrieved and analyzed from a data collector 104, it may no longer be necessary for that data collector to respond to subsequent scanning by the printer 132. The server 124 can therefore provide a configuration parameter to the printer 132 to switch the data collector 104 to an inactive state, in which the data collector 104 will no longer respond to detection scans at block 205.

FIG. 5 illustrates an example performance of block 245. In particular, the printer 132 transmits an indicator activation parameter 504-1 to the data collector 104-1, to cause the output device 118 of the data collector 104-1 to flash, indicating a validation failure. In addition, the printer 132 can transmit operational state parameters 508-1 and 508-2 to the data collectors 104-1 and 104-2, inactivating the data collectors 104-1 and 104-2 as described above.

In some examples, the configuration parameters applied at block 245, based on command(s) received at block 225, can include configuration parameters for the printer 132 itself. Such configuration parameters can include commands to reset the printer 132, decommission the printer 132, or the like. Further examples of configuration parameters can include firmware updates, encryption certificate updates, and the like. Further, it is contemplated that such configuration commands can be sent by the server 124 to the printer 132 in the absence of collected data in some cases. That is, the server can generate and send commands to the printer 132 at block 220, without the performance of blocks 205-215.

Following application of configuration parameters at block 245, the printer 132 proceeds to block 250. When, as in this example, the determination at block 250 is negative, the performance of the method 200 ends.

In further examples, as will be apparent from the discussion above, data retrieval commands can include commands to provide data to the server 124 that are connected directly with the printer 132, rather than with the data collectors 104. For example, the server 220 can instruct the printer 132 to return device information for the printer 132 itself, such as firmware versions, serial numbers, encryption certificates, and the like. As noted above, such retrieval commands can be generated at block 220 by the server whether or not data collection occurs at blocks 205-215.

As will now be apparent, the method 200 can also be employed to initialize the data collectors 104, in addition to or instead of later validation of monitoring data. For example, prior to the shipment of packages bearing data collectors 104, the above process can be employed to retrieve configuration parameters from the server 124 that guide data collection by the data collectors 104. Such parameters can include a frequency of measurement, excursion thresholds, and the like. As will further be apparent, in an initialization use case, the server 124 can also provide print commands to the printer 132, for the generation of labels bearing the measurement parameters, which can be affixed to packages.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device, comprising:
a housing configured to receive a supply of print media;
a print head supported by the housing;
a wireless communications subsystem supported by the housing;
a controller supported by the housing, the controller configured to:
control the communications subsystem to detect a data collection device;
obtain, from the data collection device via the communications subsystem, monitoring data collected by the data collection device indicative of an environmental condition;
transmit the monitoring data;
receive a command based on the monitoring data; and
control the print head to apply indicia to the print media according to the command,
wherein the command includes an indication of whether the monitoring data passes or fails a validation; and
wherein the controller is further configured to retrieve a label format according to the indication and control the print head according to the label format.

2. The computing device of claim 1, wherein the controller is further configured, prior to retrieval of the monitoring data, to:
obtain an identifier of the data collection device;
transmit the identifier to a server; and
receive, from the server, an initial command to retrieve the monitoring data.

3. The computing device of claim 1, wherein the monitoring data includes at least one of temperature measurements, and humidity measurements.

4. The computing device of claim 1, wherein the communications subsystem includes a first short-range communications interface for communication with the data collection device, and a second communications interface for communication with a server, and wherein the controller is further configured to:
detect the data collection device and retrieve the monitoring data using the first communications interface; and
transmit the monitoring data to the server and receive the command using the second communications interface.

5. The computing device of claim 1, wherein the command includes a configuration parameter, the controller is further configured to write the configuration parameter to the data collection device via the communications subsystem, and the configuration parameter includes an activity state of at least one of a visual indicator or audible indicator of the data collection device.

6. The computing device of claim 1, wherein the monitored data from the data collector indicates that the environmental condition has at least one of exceeded a specified temperature more than a first specified number of times, exceeded the specified temperate for more than a first specified amount of time, exceeded a specified humidity more than a second specified number of times, or exceeded the specified humidity for more than a second specified amount of time, and
the controller controls the print head to apply indicia to the print media that the validation failed.

7. A computing device, comprising:
a housing configured to receive a supply of print media;
a print head supported by the housing;
a wireless communications subsystem supported by the housing;
a controller supported by the housing, the controller configured to:
control the communications subsystem to detect a data collection device;
obtain, from the data collection device via the communications subsystem, monitoring data collected by the data collection device indicative of an environmental condition;
transmit the monitoring data;
receive a command based on the monitoring data; and
control the print head to apply indicia to the print media according to the command,
wherein the communications subsystem includes a first short-range communications interface for communication with the data collection device, and a second communications interface for communication with a server.

8. The computing device of claim 7, wherein the first communications interface is a Bluetooth interface, and wherein the second communications interface is a Wi-Fi interface.

9. The computing device of claim 7, wherein the controller is further configured to:
detect the data collection device and retrieve the monitoring data using the first communications interface; and
transmit the monitoring data to the server, and receive the command using the second communications interface.

10. The computing device of claim 7, wherein the command includes an indication of whether the monitoring data passes or fails a validation; and
wherein the controller is further configured to retrieve a label format according to the indication and control the print head according to the label format.

11. The computing device of claim 7, wherein the command includes a configuration parameter, the controller is further configured to write the configuration parameter to the data collection device via the communications subsystem, and the configuration parameter includes an activity state of an indicator of the data collection device.

12. A computing device, comprising:
a housing configured to receive a supply of print media;
a print head supported by the housing;
a wireless communications subsystem supported by the housing;
a controller supported by the housing, the controller configured to:
control the communications subsystem to detect a data collection device;
obtain, from the data collection device via the communications subsystem, monitoring data collected by the data collection device indicative of an environmental condition;
transmit the monitoring data;
receive a command based on the monitoring data; and
control the print head to apply indicia to the print media according to the command,
wherein the command includes a configuration parameter; and
wherein the controller is further configured to write the configuration parameter to the data collection device via the communications subsystem.

13. The computing device of claim 12, wherein the configuration setting includes an activity state of an indicator of the data collection device.

14. The computing device of claim 13, wherein the indicator of the data collection device is at least one of visual or audible indicator.

15. The computing device of claim 13, wherein the indicator of the data collection device is a light.

16. The computing device of claim 12, wherein the communications subsystem includes a first short-range communications interface for communication with the data collection device, and a second communications interface for communication with a server, and
wherein the controller is further configured to:
detect the data collection device and retrieve the monitoring data using the first communications interface; and
transmit the monitoring data to the server and receive the command using the second communications interface.

17. The computing device of claim 12, wherein the command includes an indication of whether the monitoring data passes or fails a validation; and
wherein the controller is further configured to retrieve a label format according to the indication and control the print head according to the label format.

18. A method in a computing device, the method comprising:
controlling a communications subsystem of the computing device to detect a data collection device;
obtaining, from the data collection device via the communications subsystem, monitoring data collected by the data collection device indicative of an environmental condition;
transmitting the monitoring data;
receiving a command based on the monitoring data; and
controlling a print head of the computing device to apply indicia to print media from a supply of print media supported by a housing of the computing device, according to the command,
wherein the command includes an indication of whether the monitoring data passes or fails a validation; and
wherein the method further includes retrieving a label format according to the indication and controlling the print head according to the label format.

19. The method of claim 18, further comprising, prior to retrieving the monitoring data:
obtaining an identifier of the data collection device;
transmitting the identifier to a server; and
receiving, from the server, an initial command to retrieve the monitoring data.

20. The method of claim 18, wherein the monitoring data includes at least one of temperature measurements, and humidity measurements.

21. A method in a computing device, the method comprising:
controlling a communications subsystem of the computing device to detect a data collection device;
obtaining, from the data collection device via the communications subsystem, monitoring data collected by the data collection device indicative of an environmental condition;
transmitting the monitoring data;
receiving a command based on the monitoring data; and
controlling a print head of the computing device to apply indicia to print media from a supply of print media supported by a housing of the computing device, according to the command,
wherein the communications subsystem includes a first short-range communications interface for communication with the data collection device, and a second communications interface for communication with a server.

22. The method of claim 21, wherein the first communications interface is a Bluetooth interface, and wherein the second communications interface is a Wi-Fi interface.

23. The method of claim 21, further comprising:
detecting the data collection device and retrieve the monitoring data using the first communications interface; and
transmitting the monitoring data to the server, and receive the command using the second communications interface.

24. The method of claim 21, wherein the command includes an indication of whether the monitoring data passes or fails a validation; and
wherein the method further includes retrieving a label format according to the indication and controlling the print head according to the label format.

25. A method in a computing device, the method comprising:
controlling a communications subsystem of the computing device to detect a data collection device;
obtaining, from the data collection device via the communications subsystem, monitoring data collected by the data collection device indicative of an environmental condition;
transmitting the monitoring data;
receiving a command based on the monitoring data; and
controlling a print head of the computing device to apply indicia to print media from a supply of print media supported by a housing of the computing device, according to the command,
wherein the command includes a configuration parameter; and
wherein the method further includes writing the configuration parameter to the data collection device via the communications subsystem.

26. The method of claim 25, wherein the configuration setting includes an activity state of an indicator light of the data collection device.

27. A non-transitory computer-readable medium storing instructions executable by a processor a computing device to:
- control a communications subsystem of the computing device to detect a data collection device;
- obtain, from the data collection device via the communications subsystem, monitoring data collected by the data collection device indicative of an environmental condition;
- transmit the monitoring data;
- receive a command based on the monitoring data; and
- control a print head of the computing device to apply indicia to print media from a supply of print media supported by a housing of the computing device, according to the command
- wherein the command includes at least one of: (i) an indication of whether the monitoring data passes or fails a validation, and the method further includes retrieving a label format according to the indication and controlling the print head according to the label format or (ii) a configuration parameter, and the method further includes writing the configuration parameter to the data collection device via the communications subsystem.

* * * * *